United States Patent [19]

Ingham et al.

[11] 4,100,331
[45] Jul. 11, 1978

[54] DUAL MEMBRANE, HOLLOW FIBER FUEL CELL AND METHOD OF OPERATING SAME

[76] Inventors: James C. Fletcher, Administrator of the National Aeronautics and Space Administration, with respect to an invention of John D. Ingham, La Crescenta; Daniel D. Lawson, Arcadia, both of Calif.

[21] Appl. No.: 765,138

[22] Filed: Feb. 3, 1977

[51] Int. Cl.² .............................................. H01M 4/86
[52] U.S. Cl. ....................................... 429/13; 429/41; 429/42
[58] Field of Search .................... 429/13, 40, 41, 42

[56] References Cited

U.S. PATENT DOCUMENTS

| | | | |
|---|---|---|---|
| 3,116,170 | 12/1963 | Williams et al. | 429/42 |
| 3,152,013 | 10/1964 | Juda | 429/40 |
| 3,228,797 | 1/1966 | Brown et al. | 429/13 |
| 3,423,243 | 1/1969 | Kordesch et al. | 429/40 |
| 3,477,877 | 11/1969 | Kordesch | 429/42 |

*Primary Examiner*—J. H. Mack
*Assistant Examiner*—H. A. Feeley
*Attorney, Agent, or Firm*—Monte F. Mott; John R. Manning; Wilfred Grifka

[57] ABSTRACT

A gaseous fuel cell is described which includes a pair of electrodes formed by open-ended, ion-exchange hollow fibers, each having a layer of metal catalyst deposited on the inner surface thereof and large surface area current collectors such as braided metal mesh in contact with the metal catalyst layer. A fuel cell results when the electrodes are immersed in electrolyte and electrically connected. As hydrogen and oxygen flow through the bore of the fibers oxidation and reduction reactions develop an electrical potential. Since the hollow fiber configuration provides large electrode area per unit volume and intimate contact between fuel and oxidizer at the interface, and due to the low internal resistance of the electrolyte, high power densities can be obtained.

11 Claims, 1 Drawing Figure

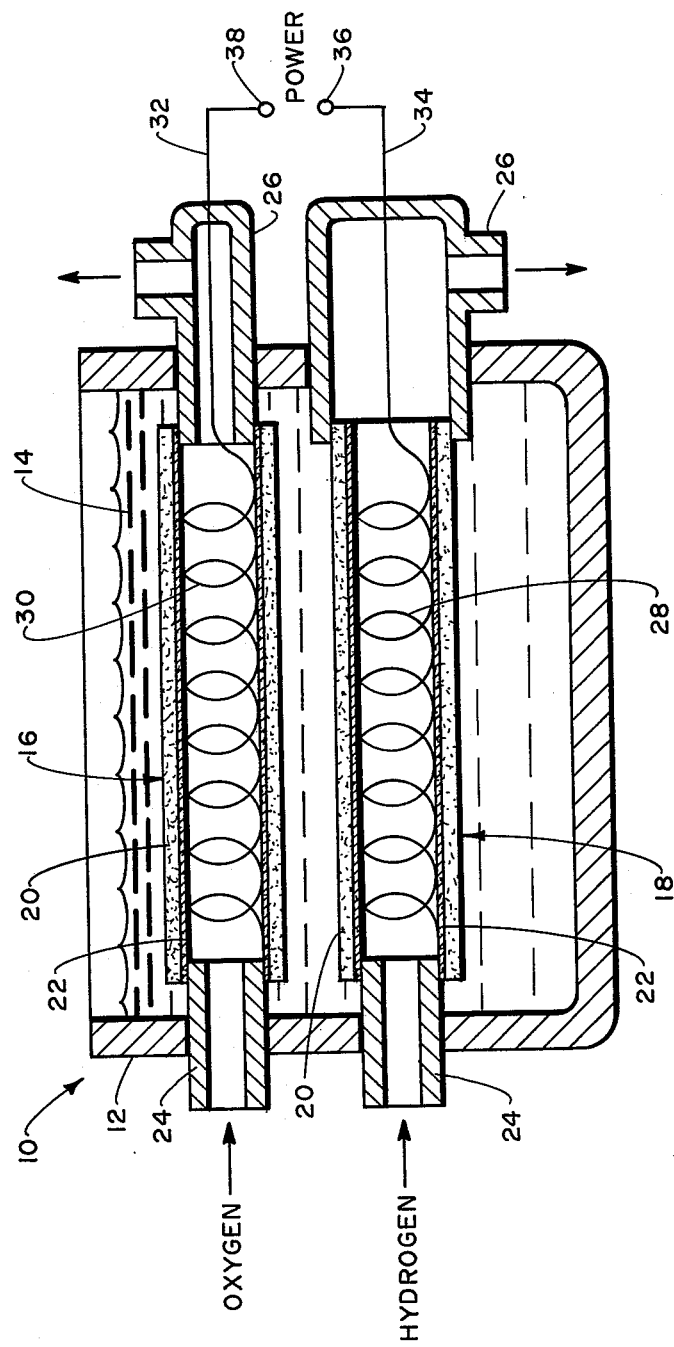

4,100,331

DUAL MEMBRANE, HOLLOW FIBER FUEL CELL AND METHOD OF OPERATING SAME

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The present invention relates to an improved fuel cell and, more particularly, this invention relates to a dual membrane, hollow fiber fuel cell.

2. Description of the Prior Art

In view of current and future domestic energy shortages there is a critical need for more efficient systems for conversion of chemical energy to electrical energy. Electrical energy is the only form of energy that is readily produced, transported, can be utilized in a controlled manner, and can be transformed to other forms of energy at nearly 100% efficiency.

The conventional methods, apart from hydroelectric power generation, of converting primary forms of energy, i.e. solar, chemical, nuclear and gravitational, to electricity pass through an intermediate conversion stage of heat energy to mechanical energy. Inherent losses occur due to the Carnot limitation and moving parts are subject to frictional losses and mechanical failure.

Direct methods of conversion are preferred due to simplicity, reliability, higher conversion efficiency and less weight and volume required by these systems. Thermoelectric, thermionic, photovoltaic and magnetohydrodynamic methods are not finding large scale application due to limitations of materials and energy/unit ratios are small.

The most promising method of direct conversion of primary sources of energy to electricity is the electrochemical method as embodied in the gaseous fuel cell such as the hydrogen-oxygen fuel cells utilized in recent space probes. Fuel cells use extremely complex flat stack arrangements consisting of a membrane, gaskets, channels, electrodes and current collectors that are difficult and expensive to fabricate, and, in the case of solid polymer electrolytes, are subject to catastrophic failure of the total system if there is one pinhole leak in the membrane between the oxygen and hydrogen sides. There is the example of a hollow fiber configuration for a single membrane fuel cell by Brown and Levine in U.S. Pat. No. 3,228,797. However, only very low power densities are obtained in this case because of high internal resistance and inefficient electrode and current collector configuration. Furthermore, this configuration would also fail if any membrane leakage took place.

In their theoretical treatment entitled "Fuel Cells — Their Electrochemistry" Bockris and Srinivason mention a dual spaghetti-tube fuel cell concept with electrodes and active fuel cell processes to occur on the outside of the tubes. However, this concept has the serious limitation that operation requires diffusion of hydrogen and oxygen through the membrane walls, and an operating fuel cell of this type has not yet been devised.

SUMMARY OF THE INVENTION

An improved fuel cell in accordance with the invention comprises a pair of electrodes immersed in aqueous electrolyte, each electrode being formed of an ion-permeable, gas-impermeable hollow fiber having catalytic electrode material deposited on its inner surface and having a large surface area current collector in contact with the catalytic surface. As fuel gas such as hydrogen is flowed through the fuel electrode and an oxidizing gas such as oxygen flows through the oxidizer electrode, an electric potential is developed which can be recovered and utilized or stored through the circuit joining the electrodes.

The filamentary hollow fiber configuration provides a large electrode area for a given cell volume. High power densities are obtained since the fuel and oxidizer in each electrode are in intimate contact with the electrode-electrolyte interface and the aqueous electrolyte has low internal resistance. Leakage of fuel or oxidizer through the fiber does not result in failure of the cell as is the case in single membrane fuel cells since the gas will bubble into the common body of electrolyte and is isolated from the coreactive gas. Dilution or flooding of the electrodes by water produced by the electrolysis reaction is obviated since the water that is formed migrates into the electrolyte where it can easily be removed by evaporation or distillation.

Since the hollow fiber is always exposed to electrolyte the problem of drying of the membrane and consequent failure of the cell is eliminated. Thermal control of the cell is simplified and the half cell potential of each electrode can readily be obtained by inserting a reference electrode into the common electrolyte body so that overvoltage of each electrode can be avoided and cell performance maximized. The dual hollow fiber fuel cell of this invention can be constructed relatively inexpensively due to the ease of fabrication of the hollow fiber electrodes compared with the complex flat single membrane cell configurations.

These and many other objects and attendant advantages of the invention will become apparent as the invention becomes better understood by reference to the following detailed description when considered in conjunction with the the accompanying drawing.

BRIEF DESCRIPTION OF THE DRAWING

The FIGURE is a schematic view of the dual membrane, hollow fiber fuel cell according to this invention.

DESCRIPTION OF THE PREFERRED EMBODIMENTS

Referring now to the FIGURE the fuel cell 10 generally comprises a container 12 which may be open or closed receiving a body of electrolyte 14 in which is immersed a pair of flow-through electrodes 16 and 18. The electrodes are formed of a fine, filamentary hollow fiber tube 20 having a layer of catalytically active electrode material 22 deposited on the inner surface thereof. Each tube is supported by a pair of inlet members 24 and outlet members 26 which are formed of electrically insulating and gas-impermeable materials and are sealingly received and mounted within the walls of the cell container 12. A set of high surface area current collectors 28, 30 are disposed in each electrode 16, 18 in contact with the catalytically-coated surface 22. Lead wires 32, 34 connect the current collectors 28, 30 to terminals 36, 38 from which power can be extracted.

The current collector is formed of a non-reactive metallic wire material and may be in the form of a spiral, bristles, porous metal, braid or a screen. A braided wire mesh sleeve such as a gold coated copper braided material is preferred since it can be easily slipped into the interior surface of the fine filamentary hollow fiber tube without abrading the surface thereof and by compressing the ends of the braided sleeve, the sleeve will expand into intimate contact with the catalytic electrode surface. Though only a single hollow fiber fuel electrode, and oxidizer electrode are illustrated, it is apparent that multiple tubes of each type can be attached to a common gas header, by potting the ends of the tube into adhesive and inserting them into a funnel-shape member. These multiple electrodes can be inserted into a single body of electrolyte. The electrodes may be connected in series or in parallel. More electrode tubes can be placed on the oxidizer side to balance the power efficiency of the oxidizer electrode and in order to use air instead of oxygen gas.

The cell is fabricated by inserting the current collector such as the braided metal into the fiber and compressing it to expand it against the wall. The metal catalyst may be deposited by electroless and/or electrolytic techniques. Preferably the metal catalyst is first deposited by reducing a metal salt on the inner surface of the hollow fiber and then inserting the current collector and electrolytically building up the deposit by soaking the fibers in plating solution and connecting the ends of the current collector to a source of DC potential such as a battery while reversing the polarity every few minutes. Nodules of black catalytic metal form in intimate contact with the current collector and with the inner surface of the hollow fiber. The ends of the hollow fiber are then inserted over the inner ends of the inlet and outlet members and sealed thereto with adhesive or sealant, if required. After a suitable electrolyte is added to the cell container in an amount sufficient to immerse both electrodes, the fuel cell is ready for use.

When oxidizing gas is flowed through the oxidizer electrode and a fuel gas such as hydrogen is flowed through the fuel electrode, an electric potential is developed and power can be extracted from the terminals. Excess oxidizing gas and excess fuel gas can be recovered from the outlets of the electrodes and recycled to the inlets.

The hollow fiber membrane electrode support materials are fine filamentary materials that are gas-impermeable and ion-impermeable. The inside diameter is generally less than one-fourth inch, typically from 0.5 mm to 5.0 mm, though fibers having diameters as small as 0.2 mm are available. The wall thickness is sufficient to withstand pressure during operation and the ratio of the wall thickness to diameter should be 1:2 or smaller. The hollow fibers are formed from synthetic resins typically by spinning a molten thermoplastic resin through a spinnerette die. Preferably, the hollow fiber has ion-exchange functionality, either anionic or cationic. Suitable materials are sulfonated polystyrene, quanternary amine polystyrene or preferably sulfonated polyfluoro aliphatic materials such as Nafion. Nafion is a hydrogel capable of absorbing water and of withstanding the chemical environment of the cell. Nafion has superior mechanical strength, predictable dimensional changes, high electrical conductivity and ability to transport desired ions while rejecting undesired ions and molecules. This material is preferred for the oxidizer electrode since it can withstand the effects of nascent oxygen developed therein. The fuel electrode fiber need only be resistant to the electrolyte and the less aggressive reduction reaction. Nafion is a perfluorosulfonic substituted polytetrafluorethylene in which each repeating unit has a molecular weight of about 1000 and has the following structure:

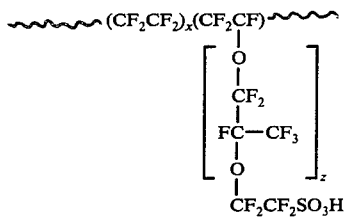

where $x$ and $z$ are integers such that the polymer has a molecular weight above 100,000, typically from 500,000 to 1,000,000 and a minimum sulfonic acid content of 1.0 millequivalents/gram, typically from 1.0 to 1.5 millequivalents/gram.

The fuel gas can be hydrogen or compounds containing hydrogen such as methane, methanol, natural gas, gasoline, hydrazine or the like. The oxidizer gas can be oxygen or oxygen-containing gases such as air. The electrolyte can be caustic or acid but is preferably aqueous, sulfuric or phosphoric acid at a concentration of 2 to 10 normal, preferably about 6 normal. The catalyst is preferably minute black beads of metal deposited on the inside surface of the hollow fiber tube and in intimate contact with the current collector. The catalytic metal must be non-reactive with the electrolyte and is preferably a noble metal such as platinum, palladium, or other metals with $d$ orbital electrons. The fuel cell of the invention operates well at ambient conditions. As with prior art fuel cells, raising the temperature increases the power output of the cell with most catalysts. Hotter temperatures can cause excessive evaporation of the water present in the electrolyte and the thermal stability of the hollow fiber tube material must be considered. The fuel and oxidizer gas pressures can be increased to raise the power density output, although in most cases the cell will be operated at or near atmospheric pressure.

An example of practice follows:

A pair of Nafion hollow fiber tubes having a nominal outer diameter of 2 mm and an inner diameter of 1.5 mm containing about 1.2 millequivalents/gram of sulfonic acid were soaked in Engelhard platinum #209 electroless plating solution which contains 6 grams Pt per pint. The impregnated tubes were then dipped into 1 to 5% by weight NaBH$_4$ solution which reduced the platinum compound to form a deposit of metal attached to the inner surface of the tubes. The tubes were then washed and dried.

A high surface area current collector in the form of a spirally wound platinum wire was inserted into each tube which were then impregnated with further platinum or other electrocatalytic plating solution. The tubes were then immersed in 6N H$_2$SO$_4$ aqueous electrolyte and the ends of the current collector connected to the terminals of a battery to electrodeposit additional platinum on the inner surface of the tubes. The polarity was reversed every several minutes until a thick powdery black deposit was present in each tube.

The hollow fiber electrodes were placed in a cell container and connected to the gas inlets and outlets and the container was filled with 6N aqueous sulfuric acid. When hydrogen and oxygen at atmospheric pressure were flowed through the tubes a power density of 20 watts/ft² was developed at the terminals.

It is to be realized that only preferred embodiments of the invention have been described and that numerous alterations, modifications and substitutions are all permissible without departing from the spirit and scope of the invention as defined in the following claims.

What is claimed is:

1. A gaseous fuel cell comprising in combination:
   a cell enclosure containing a body of aqueous inorganic acid electrolyte;
   a first, gas impermeable, ion-impermeable, tubular electrode formed of at least one fine, filamentary, perfluorosulfonic acid substituted polytetrafluoroethylene synthetic resin hollow fiber having ion-exchange functionality immersed in the body of electrolyte having a gas inlet and a gas outlet, a gas permeable layer of catalytic metal deposited only on the inside surface thereof and a first, high surface area current collector in contact with the catalytic deposit;
   a second, gas impermeable, ion-permeable, tubular counter-electrode formed of at least one fine, filamentary, perfluorosulfonic acid substituted polytetrafluoroethylene synthetic resin, hollow fiber having ion-exchange functionality immersed in the body of electrolyte having a gas inlet and a gas outlet, a gas permeable layer of catalytic metal deposited on the inside surface thereof and a second high surface area current collector in contact with the catalytic deposit;
   means for supplying a fuel gas to one of said inlets;
   means for supplying a gaseous oxidant to the other of said inlets; and
   means connected to said first and second current collectors for extracting electrical energy from the cell.

2. A fuel cell according to claim 1 in which the hollow fiber has an internal diameter less than one-fourth inch and the ratio of wall thickness to diameter is no greater than 1:2.

3. A fuel cell according to claim 2 in which the inside diameter is from 0.2 mm to 5.0 mm.

4. A fuel cell according to claim 3 in which the resin has a repeating structure of the formula:

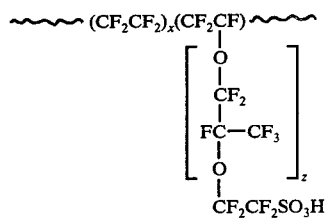

where $x$ and $z$ are integers such that the polymer has a molecular weight above 100,000 and a minimum sulfonic acid content of 1.0 millequivalents/gram.

5. A fuel cell according to claim 1 in which the electrolyte is aqueous sulfuric acid, the fuel gas is hydrogen and the oxidant gas is oxygen.

6. A fuel cell according to claim 5 in which the catalyst is finely divided particles of platinum.

7. A fuel cell according to claim 1 in which the current collector is a braided metal sleeve expanded into intimate contact with the catalyst deposit.

8. A method of electrochemically generating electrical energy in a gaseous fuel cell comprising the steps of:
   immersing in aqueous inorganic acid electrolyte a pair of gas-impermeable, ion-permeable tubular electrodes each formed of a fine, filamentary, perfluorosulfonic acid substituted polytetrafluoroethylene synthetic resin hollow fiber having ion-exchange functionality having a gas-permeable layer of catalytic metal deposited only on the inside surface thereof;
   flowing a fuel gas through one of said electrodes;
   flowing an oxidant gas through the other of said electrodes; and
   contacting each of said catalytic metal layers with a high surface area current collector.

9. A method according to claim 8 in which the resin has a repeating structure of the formula:

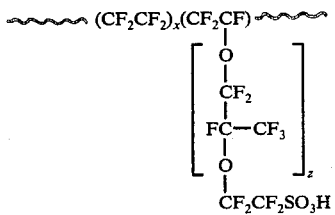

where $x$ and $z$ are integers such that the polymer has a molecular weight above 100,000 and a minimum sulfonic acid content of 1.0 millequivalents/gram.

10. A method according to claim 8 in which the electrolyte is aqueous sulfuric acid, the oxidant gas is oxygen, the fuel fas is hydrogen and the catalyst is platinum.

11. A method according to claim 8 in which the catalytic layer is deposited on the inner surface of the tubular electrodes by forming a first electroless coating of metal, inserting the current collector into the tubular electrode in intimate contact with the electroless deposit and then immersing the electrode in electrolytic plating solution and continuing the deposit formation electrolytically.

* * * * *